US012800921B2

(12) United States Patent
Lin et al.

(10) Patent No.: US 12,800,921 B2
(45) Date of Patent: Nov. 17, 2026

(54) VEHICLE DISPLAY DEVICE

(71) Applicant: Coretronic Corporation, Hsin-Chu (TW)

(72) Inventors: Yan Wen Lin, Hsin-Chu (TW); Hung-Pin Chen, Hsin-Chu (TW); Wen-Chieh Chung, Hsin-Chu (TW); Wen-Chun Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 229 days.

(21) Appl. No.: 18/679,457

(22) Filed: May 31, 2024

(65) Prior Publication Data

US 2024/0402490 A1 Dec. 5, 2024

(30) Foreign Application Priority Data

Jun. 2, 2023 (CN) ........................ 202310645468.5

(51) Int. Cl.

*G02B 27/01* (2006.01)
*B60K 35/231* (2024.01)
*G02B 27/28* (2006.01)

(52) U.S. Cl.

CPC ....... *G02B 27/0101* (2013.01); *G02B 27/283* (2013.01); *G02B 27/286* (2013.01); *B60K 35/231* (2024.01); *B60K 2360/23* (2024.01); *B60K 2360/25* (2024.01); *G02B 2027/0192* (2013.01)

(58) Field of Classification Search

CPC ............. G02B 27/0101; G02B 27/283; G02B 27/286; G02B 2027/0192; G02B 2027/0118; B60K 2360/25; B60K 2360/23; B60K 2360/31; B60K 35/231

See application file for complete search history.

(56) References Cited

U.S. PATENT DOCUMENTS

| | | | | |
|---|---|---|---|---|
| 10,012,836 | B2 | 7/2018 | Kim et al. | |
| 2017/0336628 | A1 * | 11/2017 | Kim | B60K 35/60 |

FOREIGN PATENT DOCUMENTS

| | | |
|---|---|---|
| CN | 107422477 | 3/2020 |
| CN | 114252992 | 3/2022 |

* cited by examiner

*Primary Examiner* — Angela M. Medich
(74) *Attorney, Agent, or Firm* — JCIPRNET

(57) ABSTRACT

A vehicle display device includes a light source module, a light splitting element, first and second polarization reflection modules. The light source module provides a first light beam having a first polarization state and a second light beam having a second polarization state. The light splitting element reflects the first light beam and allows the second light beam to pass through. The first polarization reflection module reflects the first light beam to the light splitting element and converts the first polarization state into the second polarization state. The second polarization reflection module reflects the first and second light beam and convert the second polarization states into third polarization states. The first and second light beam from the second polarization reflection module form a far-field virtual image and a near-field virtual image through the imaging element.

9 Claims, 4 Drawing Sheets

VEHICLE DISPLAY DEVICE

CROSS-REFERENCE TO RELATED APPLICATION

This application claims the priority benefit of China application serial no. 202310645468.5, filed on Jun. 2, 2023. The entirety of the above-mentioned patent application is hereby incorporated by reference herein and made a part of this specification.

BACKGROUND

Technical Field

The disclosure relates to a display device, and particularly relates to a vehicle display device.

Description of Related Art

In current society, in addition to the power performance of vehicles, the requirements for vehicle have also begun to focus on vehicle safety equipment. The assistance of driving assistance products (such as vehicle interior voice navigation system, voice collision warning system), has indeed reduced the incidence of accidents caused by drivers' fatigue driving lack of concentration. However, at the same time, the non-voice information display device (driving assistance product) is usually installed on the dashboard, and when the driver looks down, it is likely to affect driving safety.

Existing head-up display (HUD) for vehicles presents the driving information in front of the driver, so that the driver does not need to take his eyes away from the front of the vehicle, and can help driving safety. When the driver is driving the vehicle, images with different traffic information or driving assistance functions may be displayed in different positions by the HUD, so that the driver may obtain corresponding information at different positions of the windshield. However, because when the driver is driving the car, the human eyes focus on the far-end (about 20 meters) most of the time, so when the human eye changes focus back and forth between looking at the virtual image generated by the HUD and the external things, it may cause eye fatigue and driving hazards easily. Therefore, multiple virtual image distances (VID) are currently designed to reduce the discomfort caused by the human eye when the focus distance is too long. However, this method has the problems of large volume and high cost of the HUD.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a vehicle display device, configured to provide a first light beam and a second light beam to an imaging element, the vehicle display device including a light source module, a light splitting element, a first polarization reflection module, and a second polarization reflection module. The light source module provides the first light beam having a first polarization state and the second light beam having a second polarization state. The light splitting element is disposed on the transmission path of the first light beam and the second light beam from the light source module and configured to reflect the first light beam having the first polarization state and allow the second light beam having the second polarization state to pass through. The first polarization reflection module is disposed on the transmission path of the first light beam from the light splitting element and configured to reflect the first light beam to the light splitting element and convert the first polarization state of the first light beam into the second polarization state. The second polarization reflection module is disposed on the transmission path of the first light beam and the second light beam from the light splitting element and configured to reflect the first light beam and the second light beam and convert the first light beam and the second light beam with the second polarization state into the first light beam and the second light beam with a third polarization state. The first light beam with the third polarization state forms a far-field virtual image through the imaging element, and the second light beam with the third polarization state forms a near-field virtual image through the imaging element.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The disclosure provides a vehicle display device, which can improve the optical efficiency of a far-field virtual image and a near-field virtual image or reduce the power consumption of a light source module, and enable a user to obtain image information with a high brightness when wearing sunglasses.

Other purposes and advantages of the disclosure may be further understood from the technical characteristics revealed by the disclosure.

Figure 1:
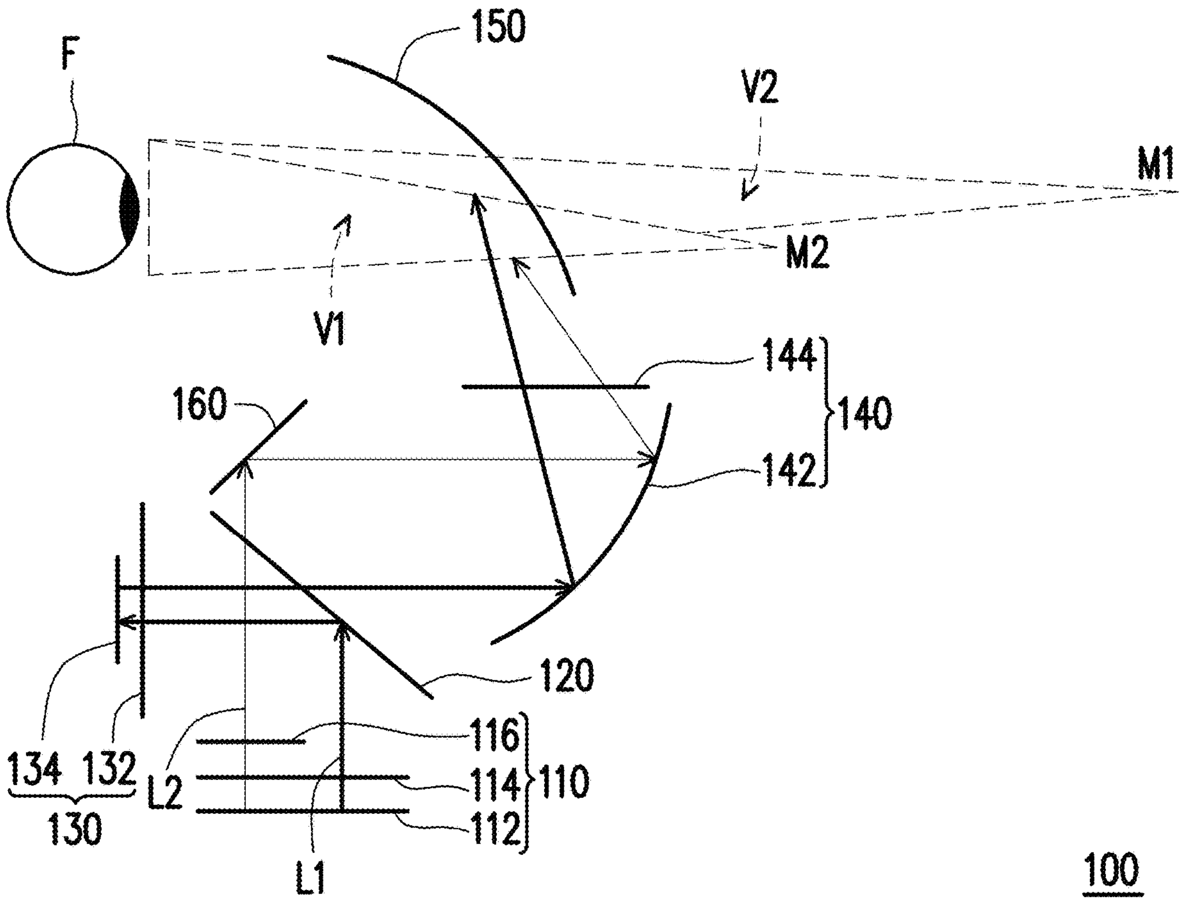
FIG. 1 is a schematic diagram of a vehicle display device according to an embodiment of the disclosure.

FIG. 1 is a schematic diagram of a vehicle display device according to an embodiment of the disclosure. Please refer to FIG. 1. This embodiment provides a vehicle display device 100, such as a head-up display (HUD), configured to provide a first light beam L1 and a second light beam L2 to an imaging element 150. The vehicle display device 100 includes a light source module 110, a light splitting element 120, a first polarization reflection module 130 and a second polarization reflection module 140. The light source module 110, the light splitting element 120, the first polarization reflection module 130, and the second polarization reflection module 140 may be disposed and hidden in a vehicle interior apparatus, such as inside the instrument console under the windshield. The imaging element 150 is, for example, the windshield. The light source module 110 (e.g., image light source module) is configured to provide light beams and transmit to the imaging element 150 to form a virtual image through the optical effects of the light splitting element 120, the first polarization reflection module 130, and the second polarization reflection module 140, so that a user F (the driver or other passengers) can observe near field image and far field image via the imaging element 150. It should be further explained that, the human eye position of the user F may accept an appropriate moving range. The range of the triangle covered by a first field of view V1 is the near-field of view of the user F, corresponding to a near-field virtual image M2 viewed by the user F, and the range of the triangle covered by a second field of view V2 is the far-field of view of the human eye position of the user F, corresponding to a far-field virtual image M1 viewed by the user F. Both the first field of view V1 and the second field of view V2 extend from the human eye position of the user F.

The light source module 110 provides the first light beam L1 having a first polarization state (e.g., linear polarization state) and the second light beam L2 having a second polarization state (e.g., linear polarization state). It should be further explained that, in FIG. 1, the arrow with a thicker line width represents the first light beam L1, and the arrow with a thinner line width represents the second light beam L2. For example, in this embodiment, the first light beam L1 and the second light beam L2 are an S-polarized light and a P-polarized light respectively. In detail, the light source module 110 includes at least one display panel 112, such as a liquid crystal display panel (LCD) or an organic light emitting diode display panel (OLED), in which the number of the display panel 112 may be single or plural to provide two light beams of different image (such as the unpolarized first light beam L1 and the second light beam L2). More specifically, in this embodiment, the light source module 110 further includes a polarization element 114 and a first half-wave plate 116. In other embodiments, the polarization element 114 may be integrated with the display panel 112.

The polarization element 114 is disposed on the transmission path of the first light beam L1 and the second light beam L2 from the at least one display panel 112. The polarization element 114 is, for example, a linear polarizer configured to polarize the first light beam L1 and the second light beam L2, so that the first light beam L1 and the second light beam L2 have the first polarization state. The first half-wave plate 116 is (only) disposed on the transmission path of the second light beam L2 from the polarization element 114 and configured to convert the second light beam L2 with the first polarization state into the second light beam L2 with the second polarization state. It should be noted that the term "convert" here refers to the change of the polarization state of the light beam due to phase delay. For example, in this embodiment, the light beam provided by the at least one display panel 112 is transmitted through the polarization element 114 and then converted into the S-polarized light, and a part of the S-polarized light is further transmitted through the first half-wave plate 116 and converted into the P-polarized light, and the other part of the S-polarized light is not transmitted to the first half-wave plate 116. Therefore, the S-polarized light not transmitted to the first half-wave plate 116 may be defined as the first light beam L1, and the light beam transmitted through the first half-wave plate 116 (converted into the P-polarized light) may be defined as the second light beam L2. However, in other embodiments, the S-polarized light and the P-polarized light may be provided by the light source module 110 in different ways, and the disclosure is not limited thereto.

The light splitting element 120 is disposed on the transmission path of the first light beam L1 and the second light beam L2 from the light source module 110. The light splitting element 120 is, for example, a polarization beam splitter configured to reflect the first light beam L1 having the first polarization state and allow the second light beam L2 having the second polarization state to pass through. For example, in this embodiment, the light splitting element 120 reflects the S-polarized light and allows the P-polarized light to pass through. Therefore, the first light beam L1 with the S-polarized from the light source module 110 is transmitted to the light splitting element 120 and reflected by the light splitting element 120, while the second light beam L2 with the P-polarized from the light source module 110 is transmitted to the light splitting element 120 will pass through the light splitting element 120.

The first polarization reflection module 130 is disposed on the transmission path of the first light beam L1 from the light splitting element 120 and configured to reflect the first light beam L1 to the light splitting element 120 and convert the first light beam L1 with the first polarization state into the first light beam L1 with the second polarization state. In detail, in this embodiment, the first polarization reflection module 130 includes a quarter-wave plate 132 and a first reflection element 134. The quarter-wave plate 132 is disposed on the transmission path of the first light beam L1 from the light splitting element 120 and configured to convert the polarization state of the first light beam L1. The first reflection element 134 is disposed on the transmission path of the first light beam L1 from the quarter-wave plate 132 (As shown in FIG. 1, the quarter-wave plate 132 is, for example, disposed between the light splitting element 120 and the first reflection element 134), the first reflection element 134 such as a planar surface reflection mirror, configured to reflect the first light beam L1 back to the quarter-wave plate 132, so that the reflected first light beam L1 transmits to the quarter-wave plate 132, and the polarization state of the first light beam L1 is converted into the second polarization state after passing again through the quarter-wave plate 132. For example, in this embodiment, the first light beam L1 with the S-polarized from the light splitting element 120 transmits through the quarter-wave plate 132 and is converted into the circularly polarized or elliptically polarized first light beam L1, and is converted into the circularly polarized or elliptically polarized first light beam L1 with different polarization state through reflection by the first reflection element 134. The circularly polarized or elliptically polarized first light beam L1 from the first reflection element 134 with different polarization state transmits through the quarter-wave plate 132 and is converted into the first light beam L1 with the P-polarized state. Therefore, due to the first polarization reflection module 130, the first light beam L1 from the first polarization reflection module 130 has the P-polarized state, and when it transmitted to the light splitting element 120, it can pass through the light splitting element 120.

The second polarization reflection module 140 is disposed on the transmission path of the first light beam L1 and the second light beam L2 from the light splitting element 120, and The second polarization reflection module 140 is configured to reflect the first light beam L1 and the second light beam L2 and convert the first light beam L1 and the second light beam L2 with the second polarization states into the first light beam L1 and the second light beam L2 with third polarization states. In detail, in this embodiment, the second polarization reflection module 140 includes a second reflection element 142 and a second half-wave plate 144. The second reflection element 142 is disposed on the transmission path of the first light beam L1 and the second light beam L2 from the light splitting element 120 and configured to reflect the first light beam L1 and the second light beam L2. The second half-wave plate 144 is disposed on the transmission path of the first light beam L1 and the second light beam L2 from the second reflection element 142 and configured to convert the first light beam L1 and the second light beam L2 with the second polarization states into the first light beam L1 and the second light beam L2 with the third polarization states. The second reflection element 142 is, for example, a free curved surface reflection mirror. The second half-wave plate 144 may rotate horizontally relative to the display panel 112 (that is, changing the included angle between an optical axis of the second half-wave plate 144 and the polarization axis of the first light beam L1) to adjust the third polarization states of the first light beam L1 and the second light beam L2. For example, in this embodiment, the first light beam L1 with the P-polarized and the second light beam L2 with the P-polarized from the light splitting element 120 are reflected by the second reflection element 142 and transmitted through the second half-wave plate 144; in which, when the second half-wave plate 144 does not rotate relative to the display panel 112 (that is, the optical axis of the second half-wave plate 144 corresponds to the polarization axis of the first light beam L1), the first light beam L1 with the P-polarized and the second light beam L2 with the P-polarized are converted into the first light beam L1 with the S-polarized and the second light beam L2 with the S-polarized respectively. In other words, the third polarization states are equal to the first polarization state; However, if the second half-wave plate 144 is horizontally rotated by 0° to 45° relative to the display panel 112, then the first light beam L1 with the P-polarized and the second light beam L2 with the P-polarized may be converted into the circularly polarized state or the elliptically polarized state. In other words, the third polarization states are different from the first polarization state. In addition, in this embodiment, the second half-wave plate 144 may be used as a protective cover to further protect the optical system (e.g., from the light source module 110 to the second polarization reflection module 140), to prevent foreign objects from entering the optical system and affecting the optical effect.

In some embodiments, the vehicle display device 100 may further include an adjustment device (not shown), the adjustment device may be connected to the first reflection element 134 of the first polarization reflection module 130 to adjust the rotation angle of the first reflection element 134, or the adjustment device may be connected to the second reflection element 142 of the second polarization reflection module 140 to adjust the rotation angle of the second reflection element 142. In addition, the adjustment device may also be connected to the first reflection element 134 and the second reflection element 142 at the same time, and the disclosure is not limited thereto. In this way, the position and the incident angle of the first light beam L1 and the second light beam L2 transmitted to the subsequent optical element can be further adjusted to obtain a good display effect.

In addition, in this embodiment, the vehicle display device 100 further includes a third reflection element 160 disposed on the transmission path of the second light beam L2 from the light splitting element 120 and configured to reflect the second light beam L2 to the second polarization reflection module 140. The third reflection element 160 is, for example, a planar surface mirror, but the disclosure is not limited thereto. In this way, the degree of freedom in planning the optical path can be increased or the optical path can be shortened, thereby obtaining a good display effect.

Figure 2:
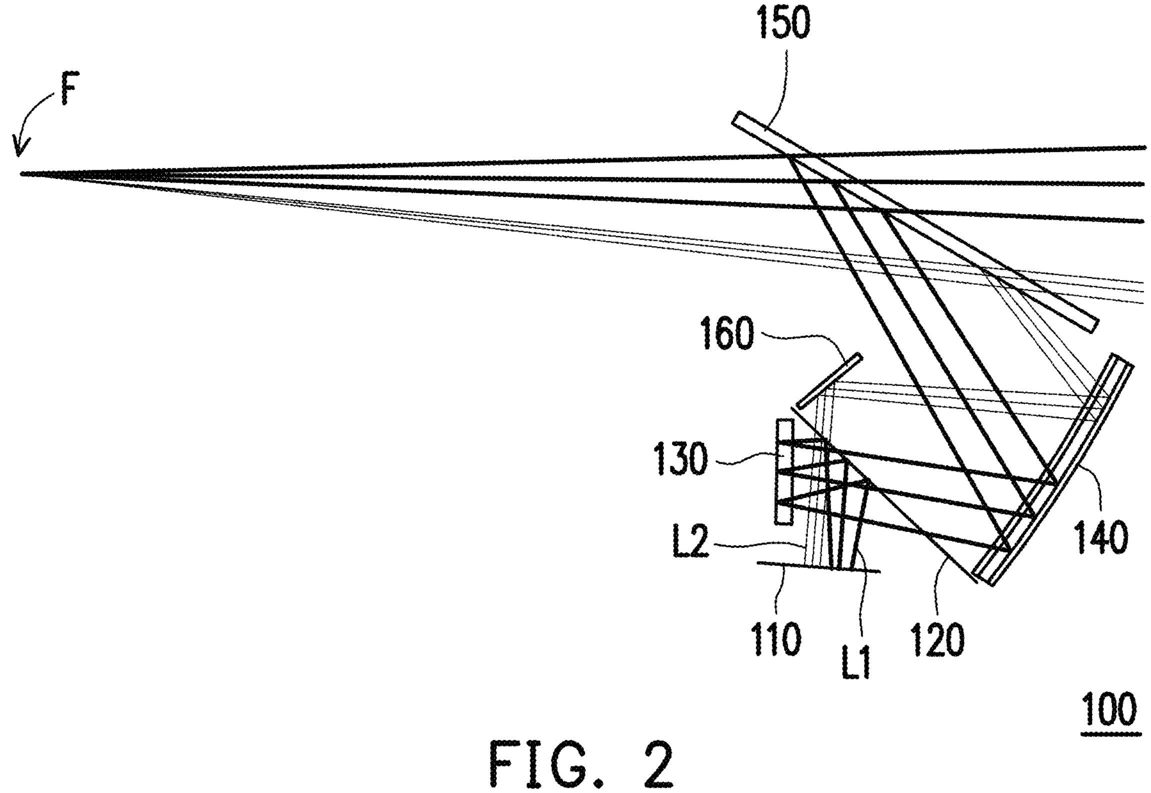
FIG. 2 is a schematic diagram of an optical path of the vehicle display device shown in FIG. 1.
Figure 3:
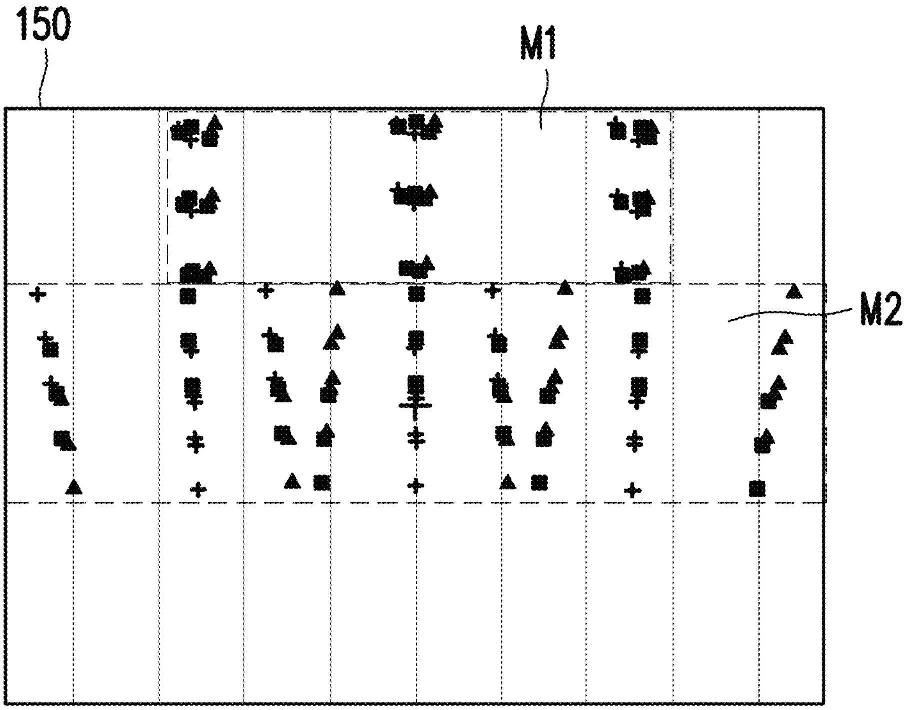
FIG. 3 is an imaging schematic diagram of the vehicle display device shown in FIG. 1.

FIG. 2 is a schematic diagram of an optical path of the vehicle display device shown in FIG. 1. FIG. 3 is an imaging schematic diagram of the vehicle display device shown in FIG. 1. Please refer to FIG. 1 to FIG. 3. The imaging element 150 is disposed on the transmission path of the first light beam L1 and the second light beam L2 from the second polarization reflection module 140. The first light beam L1 (with the third polarization state) forms a far-field virtual image M1 through the imaging element 150, and the second light beam L2 (with the third polarization state) forms a near-field virtual image M2 through the imaging element 150, as shown in FIG. 3. For example, in this embodiment, the first light beam L1 from the second polarization reflection module 140 is transmitted to the upper part of the imaging element 150 to form the far-field virtual image M1, and the second light beam L2 from the second polarization reflection module 140 is transmitted to the lower part of the imaging element 150 to form the near-field virtual image M2, and both the first light beam L1 and the second light beam L2 are in the third polarization state. In other words, the first light beam L1 and the second light beam L2 may both be in the S-polarized state, the circularly polarized state, or the elliptically polarized state. In other words, the light beam corresponding to the far-field virtual image M1 and the light beam corresponding to the near-field virtual image M2 have the same polarization state. In this way, compared with the conventional vehicle display apparatus using the orthogonal polarization state optical system, the optical system of the vehicle display device 100 proposed in this embodiment has the same polarization state, which can improve the optical efficiency of the far-field virtual image M1 and the near-field virtual image M2 or reduce the power consumption of the light source module 110. It is worth mentioning that, when the first light beam L1 and the second light beam L2 transmitted to the imaging element 150 are both in the S-polarized state, since the reflectivity of the windshield to the S-polarized light is high, the optical efficiency can be further improved or the power consumption of the light source module 110 can be reduced. In addition, when the user F wears sunglasses, it is necessary to ensure that the first light beam L1 and the second light beam L2 transmitted to the imaging element 150 are both in the circularly polarized state or the elliptically polarized state. If the first light beam L1 and the second light beam L2 transmitted to the imaging element 150 are both in the S-polarized state, then the user F cannot see the image when wearing the sunglasses.

Regarding FIG. 2, it should be further explained that, the light beam at a side of the imaging element 150 facing the user F is the path of the actual image light transmitted to the eyes of the user F after the first light beam L1 and the second light beam L2 are reflected by the imaging element 150, and the light beam at a side of the imaging element 150 facing away from the user F is the virtual image seen in the near view and the far view after being superimposed through the human eyes. In addition, the arrow with the thicker line width represents the first light beam L1, and the arrow with the thinner line width represents the second light beam L2.

Figure 4:
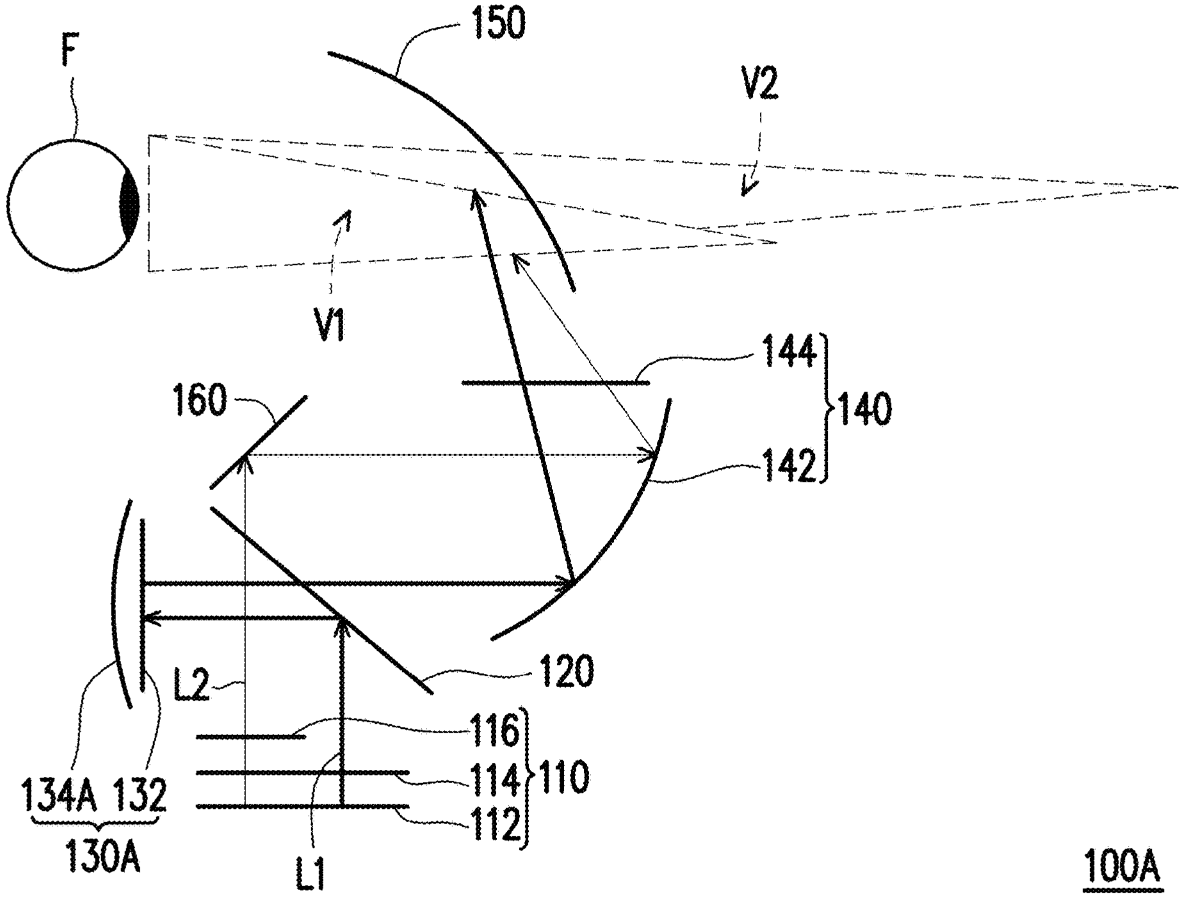
FIG. 4 is a schematic diagram of a vehicle display device according to another embodiment of the disclosure.

FIG. 4 is a schematic diagram of a vehicle display device according to another embodiment of the disclosure. Please refer to FIG. 4. The vehicle display device 100A of this embodiment is similar to the vehicle display device 100 shown in FIG. 1. The difference between the two is that, in this embodiment, a first reflection element 134A of a first polarization reflection module 130A has a diopter, such as an aspheric concave mirror. In this way, by adjusting the radius of curvature and aspheric coefficient of the first reflection element 134A, the optical path can be effectively reduced, so that the display images for generate the far-field virtual image M1 and the near-field virtual image M2 can be displayed at the same time on different region of a single display panel (such as the display panel 112) in a space-divided manner, which can effectively reduce the volume of the vehicle display device. It should be further explained that, in FIG. 4, the arrow with the thicker line width represents the first light beam L1, and the arrow with the thinner line width represents the second light beam L2.

In summary, in the vehicle display device of the disclosure, the light source module provides the first light beam having the first polarization state and the second light beam having the second polarization state. Through the optical effect of the light splitting element, the first polarization reflection module, and the second polarization reflection module, the first light beam and the second light beam having the same polarization state can be transmitted to the imaging element for imaging, so as to form the far-field virtual image and the near-field virtual image having the same polarization state through the imaging element respectively. In this way, the optical efficiency of the far-field virtual image and the near-field virtual image can be improved or the power consumption of the light source module can be reduced, and the user can obtain image information with a high brightness when wearing sunglasses.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term “the invention”, “the present invention” or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use “first”, “second”, etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A vehicle display device, configured to provide a first light beam and a second light beam to an imaging element, the vehicle display device comprising a light source module, a light splitting element, a first polarization reflection module, and a second polarization reflection module, wherein:

the light source module provides the first light beam having a first polarization state and the second light beam having a second polarization state;

the light splitting element is disposed on a transmission path of the first light beam and the second light beam from the light source module and configured to reflect the first light beam having the first polarization state and allow the second light beam having the second polarization state to pass through;

the first polarization reflection module is disposed on a transmission path of the first light beam reflected from the light splitting element and configured to reflect the first light beam to the light splitting element and convert the first polarization state of the first light beam into the second polarization state;

the second polarization reflection module is disposed on a transmission path of the first light beam having the second polarization state passing through the light splitting element and a transmission path of the second light beam passing through the light splitting element and configured to reflect the first light beam and the second light beam and convert the first light beam and the second light beam with the second polarization state into the first light beam and the second light beam with a third polarization state; and the first light beam with the third polarization state forms a far-field virtual image through the imaging element, and the second light beam with the third polarization state forms a near-field virtual image through the imaging element.

2. The vehicle display device as claimed in claim 1, wherein the light source module comprises at least one display panel.

3. The vehicle display device as claimed in claim 2, wherein the light source module further comprises a polarization element and a first half-wave plate, wherein:

the polarization element is disposed on a transmission path of the first light beam and the second light beam from the at least one display panel and configured to polarize the first light beam and the second light beam, so that the first light beam and the second light beam have the first polarization state; and The first half-wave plate is disposed on a transmission path of the second light beam from the polarization element and configured to convert the first polarization state of the second light beam into the second polarization state.

4. The vehicle display device as claimed in claim 1, wherein the first polarization reflection module comprises a quarter-wave plate and a first reflection element, wherein:

the quarter-wave plate is disposed on the transmission path of the first light beam from the light splitting element and configured to convert a polarization state of the first light beam; and the first reflection element is disposed on a transmission path of the first light beam from the quarter-wave plate and configured to reflect the first light beam, so that the reflected first light beam passes through the quarter-wave plate, and the polarization state of the first light beam is converted into the second polarization state after passing through the quarter-wave plate.

5. The vehicle display device as claimed in claim 4, wherein the first reflection element has a diopter.

6. The vehicle display device as claimed in claim 1, wherein the second polarization reflection module comprises a second reflection element and a second half-wave plate, wherein:

the second reflection element is disposed on the transmission path of the first light beam having the second polarization state passing through the light splitting element and the transmission path of the second light beam passing through the light splitting element and configured to reflect the first light beam and the second light beam;

the second half-wave plate is disposed on a transmission path of the first light beam and the second light beam from the second reflection element and configured to convert the second polarization states of the first light beam and the second light beam into the third polarization states.

7. The vehicle display device as claimed in claim 6, wherein the second reflection element is a free curved surface reflection mirror.

8. The vehicle display device as claimed in claim 6 further comprises an adjustment device connected to the second reflection element to adjust a rotation angle of the second reflection element.

9. The vehicle display device as claimed in claim 1 further comprises a third reflection element disposed on the transmission path of the second light beam passing through the light splitting element and configured to reflect the second light beam to the second polarization reflection module.

* * * * *